United States Patent
Lucas et al.

(10) Patent No.: US 7,509,631 B2
(45) Date of Patent: Mar. 24, 2009

(54) SYSTEMS AND METHODS FOR IMPLEMENTING A COMPUTER LANGUAGE TYPE SYSTEM

(75) Inventors: Paul J. Lucas, Mountain View, CA (US); Daniela D. Florescu, Palo Alto, CA (US); Fabio Riccardi, Palo Alto, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 765 days.

(21) Appl. No.: 11/004,462

(22) Filed: Dec. 3, 2004

(65) Prior Publication Data

US 2006/0010124 A1    Jan. 12, 2006

Related U.S. Application Data

(60) Provisional application No. 60/573,401, filed on May 21, 2004.

(51) Int. Cl.
*G06F 9/44* (2006.01)
(52) U.S. Cl. ........................................ 717/114
(58) Field of Classification Search .............. None
See application file for complete search history.

(56) References Cited

U.S. PATENT DOCUMENTS 7,194,462 B2 *    3/2007    Riccardi et al. ............. 707/4
7,240,004 B1 *    7/2007    Allauzen et al. ............ 704/255
7,240,048 B2 *    7/2007    Pontius ....................... 707/3
2004/0013307 A1 *    1/2004    Thienot et al. ............ 382/232

OTHER PUBLICATIONS

Markus Forsberg; Finite State Transducers in Haskell; Aug. 28, 2001; p. 1-41.*
Andrew Eisenberg, An Early Look at XQuery, Dec. 2002, SIGMOD Record, vol. 31, No. 4, pp. 113-120.*
Daniela Florescu, The BEA/SQRL Streaming XQuery Processor, 2003, pp. 1-12.*

* cited by examiner

*Primary Examiner*—Tuan Q Dam
*Assistant Examiner*—Hanh T Bui
(74) *Attorney, Agent, or Firm*—Fliesler Meyer LLP

(57) ABSTRACT

The invention provides systems and methods for implementation of a computer language type system by augmenting finite state automata algorithms to accommodate symbols having both subtype relationships and nested types. To make the classical automata algorithms work for type system with subtypes, finite state automata for a data type is augmented by additional transitions that include secondary symbols, wherein secondary symbols are subtypes of symbols of alphabet of finite state automata. A data type when compared to another data type must compare both names and the contents.

24 Claims, 3 Drawing Sheets

Augmenting an FSA with Symbol Subtypes (a) Before Augmentation (b) After Augmentation

Abridged XQueryAtomicType Class Declaration

```
public abstract class XQueryAtomicType {
    public static final XQueryAtomicType ANYURI;
    public static final XQueryAtomicType BASE64BINARY;
    // - - -
    public static final XQueryAtomicType YEARMONTHDURATION;

Object              clone();
    boolean             isCastableTo(XQueryAtomicType t);
    boolean             isPromotableTo(XQueryAtomicType t);
    boolean             isSubtypeOf(XQueryAtomicType t);
    XQueryAtomicType    superType();
}
```

FIG. 1

The Type (xs:integer|xs:string) * Represented as a Tree

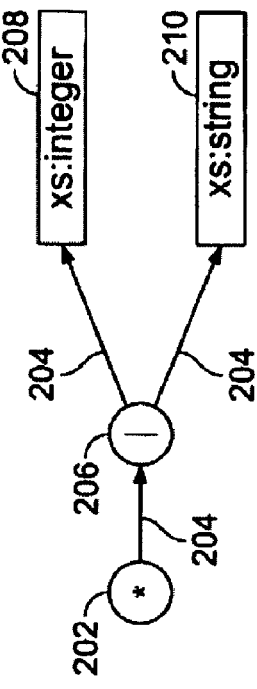

FIG. 2

**The Type (xs:integer | xs:string) * Represented as an NFA**

**The Type (xs:integer | xs:string) * Represented as a DFA**

Generating an NFA for a Union
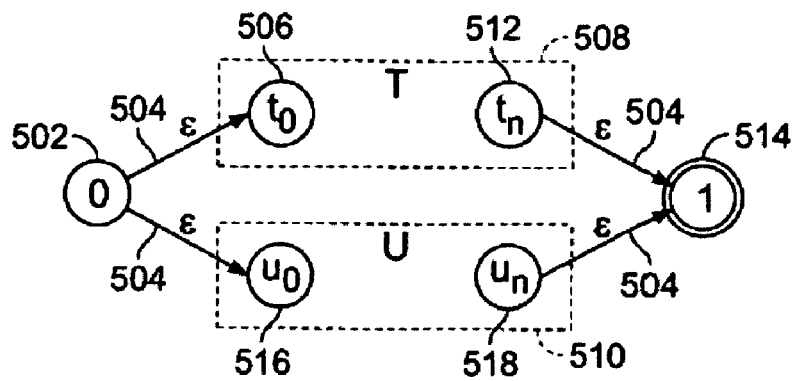
FIG. 5
Augmenting an FSA with Symbol Subtypes
(a) Before Augmentation
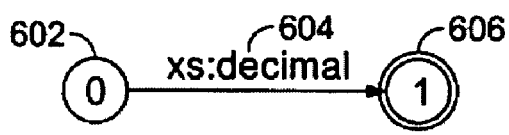
(b) After Augmentation
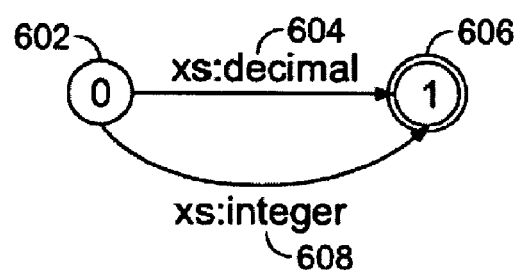
FIG. 6

US 7,509,631 B2

SYSTEMS AND METHODS FOR IMPLEMENTING A COMPUTER LANGUAGE TYPE SYSTEM

CLAIM OF PRIORITY

This application claims priority to U.S. Provisional Patent Application No. 60/573,401, entitled SYSTEMS AND METHODS FOR IMPLEMENTING A COMPUTER LANGUAGE TYPE SYSTEM, by Paul J. Lucas, Daniela D. Florescu, and Fabio Riccardi, filed May 21, 2004, which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention generally relates to implementing a type system for a computer language, and in particular to implementing a complicated type system for a computer language, including but not limited to a programming language and a data processing language, by augmenting finite state automata.

BACKGROUND

Types are used by programming languages to determine whether a particular data is in a particular form. Conventional programming languages define type systems having types such as integer, string, etc., and user-defined structures. XQuery is a programming language that defines a rich and complicated type system. XQuery is a language for querying XML documents. In addition to types found in conventional programming languages, the type system of languages like XQuery allows new types to be created using sequences (e.g., integer followed by string), alteration (e.g., integer or string), shuffle-product (e.g., integer and string in either order), and occurrences of those (zero or one, zero or more, and one or more).

Types are used by XQuery to determine whether XML data is in the required form. To determine the type of a XML data for atomic types, an XQuery processor can use a class hierarchy to model the type hierarchy as defined in the XQuery specification. For example, the built in or atomic types like xs:integer, xs:boolean, xs:date, etc. can be represented by singleton instances of classes comprising an inheritance hierarchy. FIG. 1 shows such a declaration for an abstract base class XQueryAtomicType with some details of method and data members. Complex types can be created from atomic types. For example XQuery allows complex types to be created from atomic types using sequences, alternation, shuffle-product, occurrences etc. Determining complex types requires type system answering questions like: "If two types are equal?", "Is one type a subset of another?", "Do two types intersect?" etc. Using the class hierarchy, it is not sufficient to answer the questions needed to determine complex types.

SUMMARY

The invention provides systems and methods for implementation of a computer language type system by augmenting finite state automata algorithms to accommodate symbols having both subtype relationships and nested types.

In various embodiments of the invention, answering the questions like: Are two types equal?, Is one type a subset of another?, Do two types intersect?, etc., to determine if the data is in the required form is done by using augmented finite state automata.

BRIEF DESCRIPTION OF THE DRAWINGS

FIG. 1 is an exemplary illustration of prior art showing an atomic type class declaration for implementing built-in types.

FIG. 2 is an exemplary illustration of prior art showing a complex type (xs:integer|xs:string)* represented as a tree.

FIG. 5 is an exemplary illustration of prior art showing a NFA representing union of two types T and U.

FIG. 6 is an exemplary illustration of various embodiments of the invention showing an augmentation of an FSA with symbol subtypes.

DETAILED DESCRIPTION

The invention is illustrated by way of example and not by way of limitation in the figures of the accompanying drawings in which like references indicate similar elements. It should be noted that references to "an," "one" and "various" embodiments in this disclosure are not necessarily to the same embodiment, and such references mean at least one.

XQuery allows complex types to be created from atomic types using sequences, alteration, shuffle-product, occurrences etc. A complex XQuery types such as (xs:integer|xs:string)* meaning zero or more integers or strings resemble regular expressions used in Unix shells and other programming languages. Regular expressions, and XQuery types, can be represented internally using trees. The previous example can be represented using a tree as shown in FIG. 2. 202 shows a node implementing the "zero or more" or "star" operation. 204 shows vertices in the tree linking nodes with their child nodes. 206 shows a node implementing the "alternation," "union," or "or" operation. 208 shows the child node of 206 for xs:integer. 210 shows the child node of 206 for xs:string. Using trees to represent types allow them to be constructed easily, e.g., by a compiler parsing a XQuery. Representing types as trees does not allow the questions required for determining complex types to be answered easily. One reason is because many trees can represent the same type.

Figure 3:
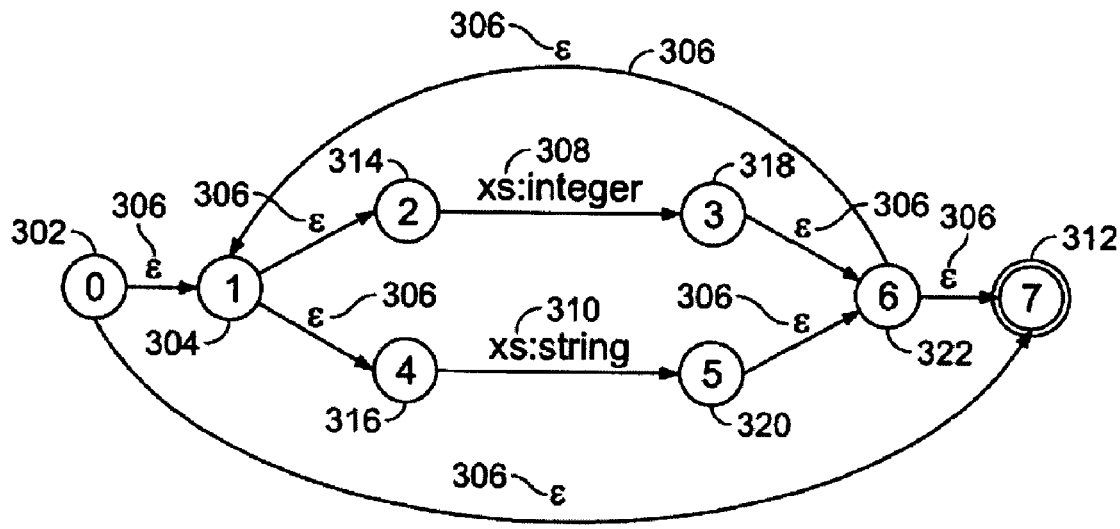
FIG. 3 is an exemplary illustration of prior art showing a type (xs:integer|xs:string)* represented as a non deterministic finite automata (NFA).

In prior art systems, complex types can be represented as finite state automata (FSA). The previous example tree can be represented using a non deterministic FSA (NFA) as shown in FIG. 3. There are classic algorithms for converting regular expressions to NFAs as shown in FIG. 2 and converting back to regular expressions as shown in FIG. 3. The numbers zero to seven in FIG. 3 represent state and the direction of arrows indicate the transition from state to state, where ϵ means empty. 302 shows the "start state" of the NFA. 304 and 322 show states added during NFA construction. 306 shows Epsilon transitions. 308 shows a transition on the type xs:integer. 310 shows a transition on the type xs:string. 312 shows the "end state" of the NFA. 314 and 318 show states for xs:integer. 316 and 320 show states for xs:string. A XQuery type can correspond to a language accepted by a FSA. Atomic XQuery types such as xs:integer and xs:string are symbols comprising the alphabet of the language. To accept input as a legal sentence in a language, a FSA starts in its start state (state zero in FIG. 3) and, upon receiving a stream of symbols, transitions to other states. If an accepting state is reached (denoted by a double circle around state seven in FIG. 3), then the given sentence is legal. Transitions on $\epsilon$ can be taken at anytime.

Figure 4:
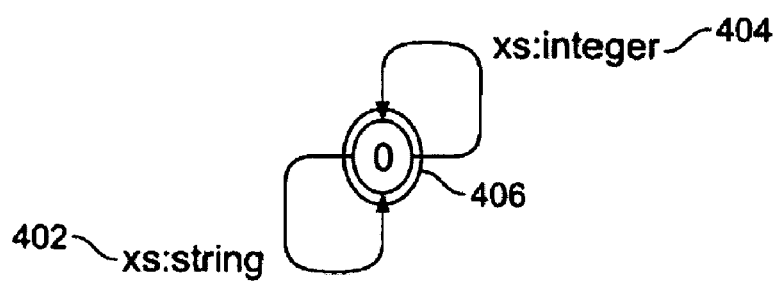
FIG. 4 is an exemplary illustration of prior art system showing a type (xs:integer|xs:string)* represented as a deterministic finite automata (DFA).

NFAs are generally not easy for computers to deal with due to the intrinsic non deterministic nature. Every NFA can be converted into a deterministic FSA (DFA) using classical algorithms. The previous example NFA as shown in FIG. 3 can be represented using a DFA as shown in FIG. 4. 402 shows the transition on the type xs:string. 404 shows the transition on the type xs:integer. 406 shows the single state of the DFA. However, even DFAs can be not quite good enough to allow the questions required to determine complex types answered easily. One of the reasons is multiple DFAs can represent the same complex type. Using a third classic algorithm for minimizing DFAs, a minimized version of a DFA can be generated in prior art systems, that represents the unique complex type. The DFA shown in FIG. 4 is minimal.

To answer the question, "Are two types equal?", one can use the equation: $T=U \equiv T \subset U$ and $U \subset T$, that is: type T is equal to type U only if T is a sub type of U and U is also a subtype of T.

To answer the question, "Is one type a sub type of another?", one can use the equation: $T \subset U \equiv T \cap U^c = \emptyset$, that is: type T is a subtype ($\subset$) of type U only if the intersection ($\cap$) of T and the complement of U ($U^c$) is empty ($\emptyset$). The complement of a DFA can be computed by merely flipping its accepting and non accepting states. A DFA is empty only if there is no way to transition from its start state to any accepting state.

To answer the question, "Do types intersect?", one can use one of DeMorgan's laws since performing a union ($\cup$) and an extra complement is less expensive than performing an intersection: $T \cap U^c = (T^c \cup U)^c$.

Since all the questions can be answered by performing an union, this union needs to be performed where T and U are DFAs representing types. To do this one can add a new start and end state (state zero and state one in FIG. 5) and add an epsilon transitions to the old start and from the old end states, then convert the resulting NFA to a minimized DFA and see if it is empty. 502 shows the new "start state" added to join the DFAs representing the types T and U. 504 shows new epsilon transitions added to join the DFAs representing the types T and U. 506 shows the "start state" of the DFA representing the type T. 508 and 510 show illustrative artifacts used to show that the details of the DFAs representing types T and U have been elided since they are not relevant to the purpose of showing how a union is performed between DFAs. 512 shows the "end state" of the DFA representing the type T. 514 shows the new "end state" added to join the DFAs representing the types T and U. 516 shows the "start state" of the DFA representing the type U. 518 shows the "end state" of the DFA representing the type U.

In classical regular languages, the symbols of the alphabet of a language have no relationship to each other. In languages with complex type system like XQuery's type system, even an atomic type can be a subtype of another, e.g., xs:integer is a subtype of xs:decimal. This affects the result of intersection. In classical regular languages, a language L accepting xs:integer and another language R accepting xs:decimal have no intersection. However in XQuery, because xs:integer is a subtype of xs:decimal, the intersection of is xs:integer.

In various embodiments, the classical automata's algorithms can be made to work by augmenting the joint alphabet with all the symbols that are subtypes of the original symbols in $L \cup R$. Then, for each transition 't' from states $s_i$ to $s_j$ a transition 'u' can be added such that:

symbol(u) $\subset$ symbol(t) and symbol(u) $\in$ symbols(L) $\cup$ symbols(R).

In various embodiments, for the above example, language R can be augmented to accept xs:integer in addition to xs:decimal prior to performing an intersection as shown in FIG. 6. In FIG. 6, (a) shows the example before augmentation and (b) shows the example after augmentation. 602 shows the "start state" of the FSA for the type xs:decimal. 604 shows the transition on the type xs:decimal. 606 shows the "end state" of the FSA for the type xs:decimal. 608 shows the new added transition on the type xs:integer. After the intersection has been performed, the reverse can be done, i.e., for each pair of transitions 't' and 'u' from states $s_i$ to $s_j$, 'u' can be removed only if symbol(u) is a subtype of symbol(t).

In classical regular languages, the symbols of the alphabet of languages are atomic, in that they are not comprising smaller or nested components. In the XQuery type system, however, element and attribute types can have wildcards in their names and the contents. For example, the XQuery type:

element *:ZipCode {xs:integer}

(Which means the element ZipCode in any namespace having a single integer for content) when compared to another element type must compare both names and the contents.

In various embodiments an element or attribute is a name-test that can have two parts: a prefix and a local name that are separated by a colon. A name-test can be of any of the forms: name:name, $\epsilon$:name, *:name, name:*, and * (which for short *:*) where name is a constant like ZipCode, '$\epsilon$' means "empty" and '*' is a wildcard that matches any name or '$\epsilon$'. The strict ordering for subtyping each part of a name-test is given by the two rules:

name $\subset$ * and $\epsilon \subset$ *

Hence a name 'n' is a subtype of 'm' only if both the prefix and the local name of 'n' are subtypes of the prefix and the local name of 'm', respectively.

In various embodiments the strict sub-typing rules can also be used to implement the intersection of the name sets. The intersection of two name-tests can be obtained by intersecting the prefixes and the local names separately, then combining the results into a new name-test: If given parts in both name-tests are constant names, then they must be equals. Otherwise, the result for each part is the most specific between the two names. For any subtype relationship: $A \subset B$, A is more specific than B. Hence "name" is the most specific between "name" and "$\epsilon$", and "$\epsilon$" is the most specific between "$\epsilon$" and "*".

Examples of strict typing rules are, foo:bar $\cap$ foo: *=foo:bar, $\epsilon$:bar $\cap$ *:bar=$\epsilon$:bar, and foo:bar $\cap$ bar:bif=$\emptyset$.

In the example, "foo:bar $\cap$ foo:*=foo:bar", "bar" is picked over "*", because it is more specific.

In various embodiments when two element types are compared, as per the rule, their content also needs to be compared. This can be handled through recursion. The complete rules for sub-typing and intersecting two elements 'e' and 'f' are:

e $\subset$ f=name-test (e) $\subset$ name-test (f) and content (e) $\subset$ content (f)

e $\cap$ f=name-test (e) $\cap$ name-test (f) and content (e) $\cap$ content (f)

An example of complete rule for sub-typing and intersecting two elements 'e' and 'f' is:

e=element *:ZipCode {xs:integer}
f=element USPostalService:* {xs:decimal}
e∩f=element USPostalService:ZipCode {xs:integer}

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for implementing a data type system for use with a computer language, comprising the steps of:
    accessing a computer language document using a programming language, wherein the programming language defines a plurality of complex data types and subtypes that specify whether data elements within the document are in a correct form;
    creating a minimized deterministic finite state automata for use with the data types and subtypes used by the programming language, wherein the finite state automata includes states that represent language data types, and transitions between the states, and wherein each of the transitions includes a symbol of the alphabet of the minimized deterministic finite state automata;
    augmenting the minimized deterministic finite state automata with additional transitions that include secondary symbols, wherein each of the secondary symbols corresponds in the programming language to a subtype of one of the data types; and
    using the augmented minimized deterministic finite state automata with automata algorithms that include intersection and union, to compare and determine if data types and subtypes in the document are one of equal, subsets or intersect.

2. A method according to claim 1, the computer language document is an XML document and the programming language is XQuery.

3. A method according to claim 1, wherein: said data type is created from atomic data types.

4. A method according to claim 1, wherein: said data type is created from atomic data types using sequences, alteration, shuffle-product and occurrences.

5. A method according to claim 1, wherein: said data type comprises wildcards in the name.

6. A method according to claim 1, wherein: said data type comprises nested data type.

7. A method according to claim 1, wherein: said computer language is a programming language.

8. A method according to claim 1, wherein: said computer language is a data processing language.

9. A computer system for implementation of a computer language data type system, comprising:
    a computer processor and computer readable storage medium having stored thereon a computer language document using a programming language, wherein the programming language defines a plurality of complex data types and subtypes that specify whether data elements within the document are in a correct form;
    a first language processor component that creates a minimized deterministic finite state automata for use with the data types and subtypes used by the programming language, wherein the finite state automata includes states that represent language data types, and transitions between the states, and wherein each of the transitions includes a symbol of the alphabet of the minimized deterministic finite state automata;
    a second language processor component that augments the minimized deterministic finite state automata with additional transitions that include secondary symbols, wherein each secondary symbol corresponds in the programming language to a subtype of one of the data types;
    a third language processor component that uses the augmented minimized deterministic finite state automata with automata algorithms that include intersection and union, to compare and determine if data types and subtypes in the document are one of equal, subsets or intersect; and
    wherein the first, second and third language processing component can be one the same language processing component and different language processing components.

10. A system according to claim 9, the computer language document is an XML document and the programming language is XQuery.

11. A system according to claim 9, wherein: said data type is created from atomic data types.

12. A system according to claim 9, wherein: said data type is created from atomic data types using sequences, alteration, shuffle-product and occurrences.

13. A system according to claim 9, wherein: said data type comprises wildcards in the name.

14. A system according to claim 9, wherein: said data type comprises nested data type.

15. A system according to claim 9, wherein: said computer language is a programming language.

16. A system according to claim 9, wherein: said computer language is a data processing language.

17. A method for implementing a data type system for use with XQuery, comprising the steps of:
    accessing an XML document using XQuery, wherein the XML comprises data elements and wherein XQuery defines a plurality of complex data types and subtypes;
    creating a minimized deterministic finite state automata for use with the XQuery data types and subtypes, wherein the finite state automata includes states that represent XQuery data types, and transitions between the states;
    augmenting the minimized deterministic finite state automata with additional transitions corresponds to XQuery subtypes; and using the augmented minimized deterministic finite state automata to compare and determine if data types and subtypes in the XML document are one of equal, subsets or intersect.

18. The method of claim 17, wherein at least some of the plurality of complex data types and subtypes are comprised of atomic data types.

19. The method of claim 18 wherein the atomic data types can include string and integer data types.

20. The method of claim 19 wherein at least some of the plurality of complex data types are a combination of both string and integer atomic data types.

21. The method of claim 17 wherein the step of using the augmented minimized deterministic finite state automata to compare and determine if data types and subtypes in the XML document are one of equal, subsets or intersect includes the steps of determining an intersection between the first data type or subtype and the complement of the second data type or subtype.

22. The method of claim 17 wherein the step of using the augmented minimized deterministic finite state automata to compare and determine if data types and subtypes in the XML document are one of equal, subsets or intersect includes the steps of determining the complement of the union between the complement of the first data type or subtype and the second data type or subtype.

23. The method of claim 17 wherein each of the data elements in the document have a type, namespace and data associated therewith and wherein the method comprises determining namesets of the data elements and using nameset information in comparing the data types and subtypes.

24. The method of claim 17 wherein at least some of the data elements have a prefix and a local name component, and wherein the method further comprises comparing two data elements by comparing their prefix and local name components.

* * * * *

UNITED STATES PATENT AND TRADEMARK OFFICE
CERTIFICATE OF CORRECTION

PATENT NO. : 7,509,631 B2
APPLICATION NO. : 11/004462
DATED : March 24, 2009
INVENTOR(S) : Lucas et al.

It is certified that error appears in the above-identified patent and that said Letters Patent is hereby corrected as shown below:

In column 6, line 37, in Claim 9, delete "component" and insert -- components --, therefor.

In column 6, line 37, in Claim 9, after "one" insert -- of --.

Signed and Sealed this

Twenty-fifth Day of May, 2010

David J. Kappos
*Director of the United States Patent and Trademark Office*